Oct. 5, 1926.
L. L. EDMUNDS
FILTER PRESS LEAF
Filed May 11, 1926
1,601,947
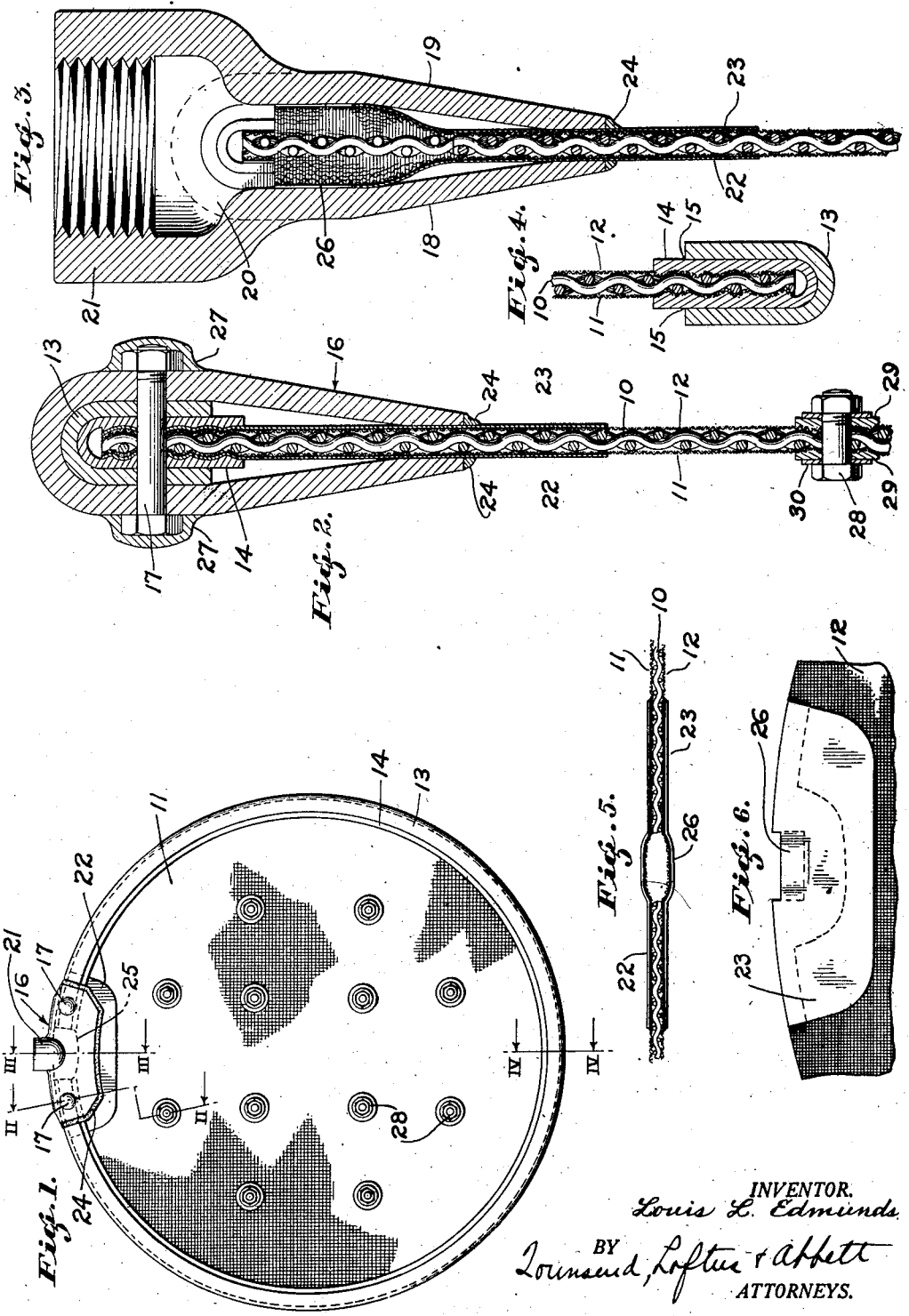
INVENTOR.
Louis L. Edmunds
BY Townsend, Loftus + Abbett
ATTORNEYS.

Patented Oct. 5, 1926.

1,601,947

UNITED STATES PATENT OFFICE.

LOUIS L. EDMUNDS, OF CROCKETT, CALIFORNIA.

FILTER-PRESS LEAF.

Application filed May 11, 1926. Serial No. 108,223.

This invention relates to a filtering apparatus and particularly pertains to the construction of filter press leaves.

It is the principal object of the present invention to provide filter press leaves for use in presses of the so-called Sweetland filter press type, and which leaves shall be rugged in their construction so that they will withstand extreme continuous or intermittent pressure imposed upon them internally or externally, and will be otherwise designed so that the leaves will not leak and permit unfiltered material to pass from the press without filtration.

The present invention contemplates the provision of a filter press leaf having a central rigid core of reticulated material upon the opposite sides of which are other sheets of reticulated material for filtering purposes, said core and filtering sheets being bound together in a manner to prevent leakage of filtering material around the filtering sheets and in the space occupied by the core.

The invention is illustrated by way of example in the accompanying drawing, in which:

Fig. 1 is a fragmentary view in elevation showing a part of a circular filter press leaf embodying the present invention.

Fig. 2 is an enlarged section through the filter press leaf on the line II—II of Fig. 1.

Fig. 3 is an enlarged section through the filter press leaf taken centrally of the outlet fitting as viewed on the line III—III of Fig. 1.

Fig. 4 is an enlarged fragmentary view in section showing the manner in which the sheets of the filter press leaf are bound together, said view being taken on the line IV—IV of Fig. 1.

Fig. 5 is a fragmentary view in elevation showing the manner in which the apron strips are fastened along the marginal edges of the filter sheets.

Fig. 6 is a fragmentary view in side elevation showing one of the apron sheets.

Referring more particularly to the drawing, 10 indicates the central foraminous core of a filter press leaf. This core is formed of stiff strands of wire made from some non-corrosive metal, which strands of wire are woven together to produce a reticulated fabric. This core is circular in shape and provides a stiff rigid backing for the entire leaf structure. Disposed upon opposite sides of the core are fine reticulated screens 11 and 12 through which the filtering operation takes place. In the present instance these screens are formed of Monel metal. The core 10 and the screens 11 and 12 are bound together around their marginal edges by a flanged annular binding ring 13 within which is disposed a metal gasket 14.

It is common practice at the present time to use gaskets made of unstable materials, as for example, asbestos, which readily deteriorates in operation and makes it possible for the liquor which is to be filtered to leak around the edges of the screen within the flanged binding ring 13 and to thus render the filtering operation inefficient. In the present instance a ductile metal is used as a gasket while a harder metal is used for the flanged binding ring 13. The beneficial results from the selection of such material are that the filtering sheets 11 and 12 are firmly pressed against the irregular sides of the core 11 by the gasket 14 and the flanged binding ring 13, and that they are made to remain in conformity with the contour of the irregular surfaces of the core due to the ductile nature of the gasket 14 which is forced against the opposite sides of the assembled screens with sufficient pressure to form indentations in the faces of the gasket, and to thus rigidly and securely hold the screen in a taut condition over the face of the core.

Another advantage is that the stretching of the marginal edges of the filtering screens 11 and 12 while making these screens conform to the opposite irregular faces of the core 10 causes the screens to be uniformly drawn taut and to be constantly held in this position due to the cooperative binding action of the rigid core 10 and the deformed gasket 14 which has been pressed against the filtering screens 11 and 12 upon opposite sides of the core.

Referring more particularly to Fig. 4, it will also be seen that the lead gasket which is in the shape of an annular ring having opposite side portions folded down upon itself and lying upon opposite sides of the assembled screens, extends inwardly beyond the inner marginal edges of the flanged binding ring 13. This eliminates a sharp cutting action commonly found to be set up between the edge of the binding ring 13 and the screens when wash water is forced into the leaves and out the filtering screens 11 and 12 in order to wash these screens. In that event, there would be a tendency to distend the screens 11 and 12 and cause them to break or be cut by the edges 15 of the binding ring 13.

By providing the extending lips of ductile material this sharp bending action along a single line will be eliminated and the cutting will be materially reduced. The binding ring 13 which is of U-shaped cross section and the gasket 14 substantially form a complete ring. Their adjoining ends, however, terminate a short distance apart and are secured within an outlet fitting 16 by bolts 17 or rivets. The construction of the outlet fitting is more clearly shown in Figs. 2 and 3 of the drawing. Here it will be seen that these fittings are formed with opposite jaws 18 and 19 which are folded down against the opposite sides of the assembled core screen 10 and filter screens 11 and 12. These jaws do not, however, bind upon the screens along their marginal edges but engage the screens at a distance from the edges so that a compartment 20 will be formed and within which compartment the filtered material may drain from between the filter screens 11 and 12 and from around the core 10. An outlet nipple 21 forms a continuation of this compartment and may be connected with threaded pipes to carry off the filtered liquor.

In order to insure that a tight seal is created between the jaws 18 and 19 of the outlet fitting 16 and the opposite sides of the filter screens 11 and 12, apron sheets 22 and 23 are provided and mounted upon opposite sides of the screen structure and interposed between these screens and the jaws. The approximate shape of the apron sheets is shown in Fig. 1 of the drawing where it will be seen that the configuration is substantially the same as that of one of the jaws 18 or 19 with the exception that it overlaps the jaw and forms a marginal flange therearound. These sheets are soldered to the jaws along the area indicated at 24 of the drawings. They are also soldered along their outer edges to the marginal edges of the screens 11 and 12 as indicated in Fig. 5 of the drawings.

In order to make it possible for the liquor to be readily drawn from between the filter leaves and into the compartment 20 of the outlet fitting, the core member is cut away a distance along its marginal edge between the spaced ends of the flanged binding ring 13 as indicated at 25 in Figs. 1 and 3. The portion of the filter screens 11 and 12 and the aprons 22 and 23 occurring between the spaced ends of the ring 13 are then spread apart to form an outlet throat 26 as more clearly indicated in Figs. 3 and 5. The aprons in the present instance are made from sheet copper and it will be evident that pressure applied exteriorly of the filter leaves will cause the flange portion of the aprons to press down against the screen and make a partial seal. The flow of liquid around the outlet fitting will be further stopped by the soldered joint 24 between the marginal edge of the jaws 18 and 19 and the soldered joint formed along the marginal edges of the aprons and the filter screens 11 and 12. The outlet fitting is rigidly secured in position other than by the clamping jaws by bolts 17. The heads of these bolts as shown in Fig. 2 and indicated at 27 are covered with solder.

In order to support the screens 11 and 12 and prevent them from being stretched out of shape and pulled from within the ring 13 when pressure is applied within the leaf, a series of bolts 28 are provided. These bolts pass through openings arranged over the area of the screens as shown in Fig. 1. The bolts have washers 29 formed of Monel metal screening and backed by washers 30 of suitable stiff material. By this arrangement a pressure of the washer 30 is not liable to cut the screens when the screens are distended.

In the assembly of a filter press leaf of the present construction, the circular core 10 and the opposite filter leaves 11 and 12 are laid in their assembled relation, after which the flanged binding ring 13 and the lead gasket 14 are folded down upon the marginal edges of the screen in the manner shown in Fig. 4 of the drawing. The gasket 14 is pressed against the opposite filter leaves 11 and 12 with such force that the filter leaves and the core 10 make indentations in the gasket, stretching the screens 11 and 12 and permanently holding the screens in their stretched condition within the binding ring 13. At the desired point along the marginal edge of the assembled screens and overlapping the space between the ends of the binding ring 13 the apron members 22 and 23 have previously been placed and soldered along the edges of the screen as indicated in Fig. 5. The throat opening 26 is then formed to spread the leaves and the outlet fitting is then applied. This is done by pressing the jaws 18 and 19 down against the apron members 22 and 23 and thereafter soldering the edges of the jaws to the aprons. The outlet fitting may then be bolted into permanent position by the bolts 17. The assembled structure is then completed by applying and tightening the bolts 28 which are arranged over the area of the screens.

It will thus be seen that by the arrangement here disclosed, a filter press leaf of rugged design may be produced and which leaf will withstand considerable use, particularly while protecting the extensive filter screens 11 and 12 from cutting along the edges of the binding ring 13. It will be further seen that by the construction and arrangement of parts here disclosed, the assembled screen may be easily dismantled when any part becomes defective and thereafter the parts may be salvaged and re-used.

While I have shown the preferred form of my invention as now known to me, it is to be understood that various changes may be made in its construction and operation without departing from the spirit of the invention as defined in the appended claims.

Having thus described my invention, what I claim and desire to secure by Letters Patent is:

1. A filter press leaf comprising a central core member, sheets of foraminous filtering material disposed upon opposite sides thereof, binding means disposed around the marginal edge of the assembled core and filter leaves for holding said core and leaves in their assembled relation, and a gasket of ductile material interposed between the binding means and the outer faces of the filter members whereby the filter members will become embedded within the ductile material and will be thus rigidly held.

2. A filter press leaf comprising a central coarse screen member, filter screens, one disposed on each side of said core, a binding ring adapted to secure the screens against the core along the peripheral margin of the filter screens, and a gasket of ductile material disposed between the binding ring and the filter screens whereby pressure of the binding member will cause the filter screen to be embedded in the ductile gaskets and conformed to the roughened surfaces of the core, thus preventing leakage of fluid from between the filter leaves while rigidly holding the filter leaves in their stretched positions.

3. A filter press leaf comprising a central coarse core member, filter screens, one disposed on each side of the core, a binding ring adapted to secure the screens against the core along the peripheral margin of the filter screens, and a gasket of ductile material disposed between the binding member and the filter screens whereby pressure of the binding ring will cause the filter screen to be embedded in the ductile gaskets and conformed to the roughened surfaces of the core, thus preventing leakage of fluid from between the filter leaves and rigidly holding the filter leaves in their stretched positions, outlet fitting aprons of thin sheet metal disposed on opposite sides of the assembled screens and cores at a point along the circumference thereof and soldered along their outer edges to the edges of the filter screens, and an outlet fitting formed with a pair of jaws adapted to be firmly pressed against the opposite sides of the assembled screens and bearing directly upon the aforesaid aprons, said fittings being soldered to the apron along their line of bearing.

4. In a filter press leaf composed of a central core upon the opposite sides of which filter screens are disposed and which core and screens are held by marginal binding means, an outlet fitting having portions lying flat against the opposite filter screens at a point along the edge of the filter leaf, and aprons of sheet metal disposed between the side portions of the outlet fitting and the filter screens, said aprons being soldered along their outer edges to the marginal edges of the respective filter screens and to the side members of the outlet fitting along the line of contact therewith.

LOUIS L. EDMUNDS.